United States Patent [19]
Khan et al.

[11] Patent Number: 5,623,568
[45] Date of Patent: Apr. 22, 1997

[54] COMPACT AND FABRICATION TOLERANT HIGH SPEED DIGITAL OPTICAL Y-SWITCHES

[75] Inventors: Mujibun N. Khan, Freehold; Jane E. Zucker, Aberdeen, both of N.J.

[73] Assignee: Lucent Technologies Inc., Murray Hill, N.J.

[21] Appl. No.: 528,823

[22] Filed: Sep. 15, 1995

[51] Int. Cl.$^6$ ................................................. G02B 6/26
[52] U.S. Cl. ........................... 385/45; 385/14; 385/15; 385/16; 385/39; 385/131; 385/132
[58] Field of Search ................................. 385/14, 15, 16, 385/17, 20, 24, 31, 39, 40, 45, 129, 130, 131, 132; 372/43, 44, 45, 50

[56] References Cited

U.S. PATENT DOCUMENTS

| | | | |
|---|---|---|---|
| 4,172,630 | 10/1979 | Burns et al. | 385/15 X |
| 4,820,009 | 4/1989 | Thaniyavarn | 385/45 X |
| 4,904,045 | 2/1990 | Alferness et al. | 385/37 X |
| 5,090,790 | 2/1992 | Zucker | 385/130 |
| 5,163,106 | 11/1992 | Okayama et al. | 385/45 |
| 5,166,991 | 11/1992 | Jaeger et al. | 385/45 X |
| 5,303,315 | 4/1994 | Granestrand | 385/16 |
| 5,305,412 | 4/1994 | Paoli | 385/24 X |
| 5,359,680 | 10/1994 | Riviere | 385/9 |
| 5,375,178 | 12/1994 | Van Der Tol | 385/11 |
| 5,418,867 | 5/1995 | Van Der Tol | 385/11 |
| 5,418,868 | 5/1995 | Cohen et al. | 385/16 |
| 5,524,156 | 6/1996 | Van Der Tol | 385/28 |

OTHER PUBLICATIONS

M. N. Khan et al., "Design and Demonstration of Weighted–Coupling Digital Y–Branch Optical Switches in InGaAs/InGaAlAs Electron Transfer Waveguides", Journal of Lightwave Technology, vol. 12, No. 11, Nov. 1994, pp. 2032–2039.

M. N. Khan et al., "Weighted–Coupling Y–Branch Optical Switch in InGaAs/InGaAlAs Quantum Well Electron Transfer Waveguides", IEEE Photonics Technology Letters, vol. 6, No. 3, Mar. 1994, pp. 394–397.

Primary Examiner—Brian Healy

[57] ABSTRACT

An optical switch provides improved high speed digital optical switching with a compact and fabrication tolerant configuration, and includes a first waveguide portion, a plurality of intermediate waveguide portions connected to the first portion, with each intermediate portion associated with a first angle $\theta_1$ where the first angle $\theta_1$ is less than about 2.0°; and a plurality of branch waveguide portions, with each branch waveguide portion connected to a respective intermediate waveguide portion and associated with a second angle $\theta_2$ where the second angle $\theta_2$ is less than $\theta_1$ and is less than about 0.3°.

27 Claims, 2 Drawing Sheets

COMPACT AND FABRICATION TOLERANT HIGH SPEED DIGITAL OPTICAL Y-SWITCHES

BACKGROUND OF THE INVENTION

1. Field of the Invention

This invention relates to optical switches, and in particular to Y-branch digital optical switches.

2. Description of the Related Art

Digital Optical Switches (DOS) are increasingly replacing other types of optical switches in a wide variety of applications, including communications systems. One of the most popular digital optical switches is the Y-branch DOS that has received wide commercial acceptance primarily because of its robustness to variations in critical parameters, such as polarization, wavelength, temperature, and to a large extent, even the device geometrical variations. Typically, a Y-branch DOS is designed such that two waveguide branches intersect to define a Y-shape structure with a very small angle at the intersection of the branches. The composition of the waveguide structure may include a wide variety of materials, such as lithium niobate, and semiconductors, to name a few. A Y-branch DOS performs its switching function by adiabatically changing (i.e. slowly varying, as opposed to abruptly altering) the light propagation direction in one of the waveguides.

Specifically, switching in a Y-branch DOS is achieved by forcing a refractive index change in one waveguide branch with respect to the other. The change in refractive index may be induced by applying, for example, voltage and/or current to selected sections of the structure. Of particular significance among the characteristics of a Y-branch DOS is its step-like responses to applied voltage or current which allow the light to remain in a higher index branch, notwithstanding increases in the applied voltage or current beyond a given threshold. Hence, by operating the Y-branch DOS beyond some threshold value for applied voltage/current, the variations in polarization, wavelength, etc. mentioned above do not impact the switching capacity of the Y-branch DOS.

In spite of all the advantages offered by Y-branch DOS, certain shortcomings of those devices may prevent their use in certain applications. For example, the relatively high voltage drive needed to power lithium niobate-based Y-branch DOS limits their operative bandwidth since microwave power increases with applied voltage. Equally bothersome is the relative oversized length of the prior-art Y-branch DOS, which increases overall optical loss for these devices, and hampers their integration with other devices because of their longer "footprints". As mentioned above, the gradual and small changes in the light propagation direction to achieve the switching function in a Y-branch DOS dictate the small angle and long footprint structure (to avoid crosstalk) of the prior art Y-branch DOS. Prominent among the limitations of the small angle, long-footprint design of Y-branch DOS is the difficulty in the fabrication of these devices to use conventional photolithographic techniques to define the small (for example, less than 0.25 micron) separation at the vertex of the two waveguiding branches of the Y-branch DOS.

In an attempt to overcome the limitations of Y-branch DOS devices, Okayama et al., in an article entitled "Reduction of Voltage-Length Product for Y-Branch Digital Optical Switch", published in JOURNAL OF LIGHTWAVE TECHNOLOGY, VOL. 11, NO. 2, 1983, pp. 379–387, proposed a two-angle shaped Y-branch DOS that provided enhanced crosstalk performance, reduced length and lower voltage drive for a Y-branch DOS. An example of the Okayama two-angle shaped Y-branch DOS is shown in FIG. 1, where the Y-branch DOS 10 has a first waveguide portion 12 connected to intermediate waveguide portions 14, 16 at a vertex 18, with each of intermediate waveguide portions 14, 16 associated with a first taper angle $\theta_1$ and symmetrical about a longitudinal axis 20 of the first waveguide portion 12.

Each of second waveguide portions 22, 24 is respectively connected to the first waveguide portions 14, 16 and associated with a second taper angle $\theta_2$. In this DOS 10, $\theta_2 < \theta_1$ to form the tapered Y-branch configuration. Each of waveguide portions 12–16 and 22–24 may have identical widths w, and the configuration 10 may be symmetrical about the longitudinal axis 20.

Other prior art techniques modified the Okayama two-angle design to further reduce the length, the voltage/current drive and cross-talk degradation of a Y-branch DOS. Unfortunately, all the prior-art techniques do not change the compactness, and the voltage/current drive of a Y-branch DOS to an extent that significantly impacts the operative bandwidth of a Y-branch DOS. Equally lamentable is the lack of a design that would allow ease of fabrication of Y-branch DOS using conventional photolithographic techniques.

SUMMARY

An optical switch is disclosed including a first waveguide portion; a plurality of intermediate waveguide portions connected to the first waveguide portion and associated with a first angle $\theta_1$ being less than about 2.0°, and a plurality of branch waveguide portions connected to a respective intermediate waveguide portion and associated with a second angle $\theta_2$, wherein the second angle $\theta_2$ is less than $\theta_1$ and is less than about 0.3°.

In an embodiment of the principles of the invention, a digital optical switch includes a Y-shape adiabatic structure that is comprised of 1) a straight passive waveguide section that receives electromagnetic energy from a source via an input port, 2) a trapezoidal shaped active waveguide section which has a small base that a) couples the active waveguide section to the straight passive waveguide section, and b) tapers to an angle of no more than 2.0° via which electromagnetic energy is transferred from the straight passive waveguide section to the active waveguide section for conversion thereto to optical energy that has one of two selected optical indexes, and 3) first and second waveguide branches that are i) separated from each other by a distance of no more than 1.5 μm such that the first and second waveguide branches define an angle of 0.2°, and ii) arranged to receive the optical energy outputted by the active waveguide section at respective first and second refractive indexes.

BRIEF DESCRIPTION OF THE DRAWINGS

The features of the disclosed Y-branch switch will become more readily apparent and may be better understood by referring to the following detailed description of an illustrative embodiment of the present invention, taken in conjunction with the accompanying drawings, where.

DESCRIPTION OF THE PREFERRED EMBODIMENTS

Figure 1:
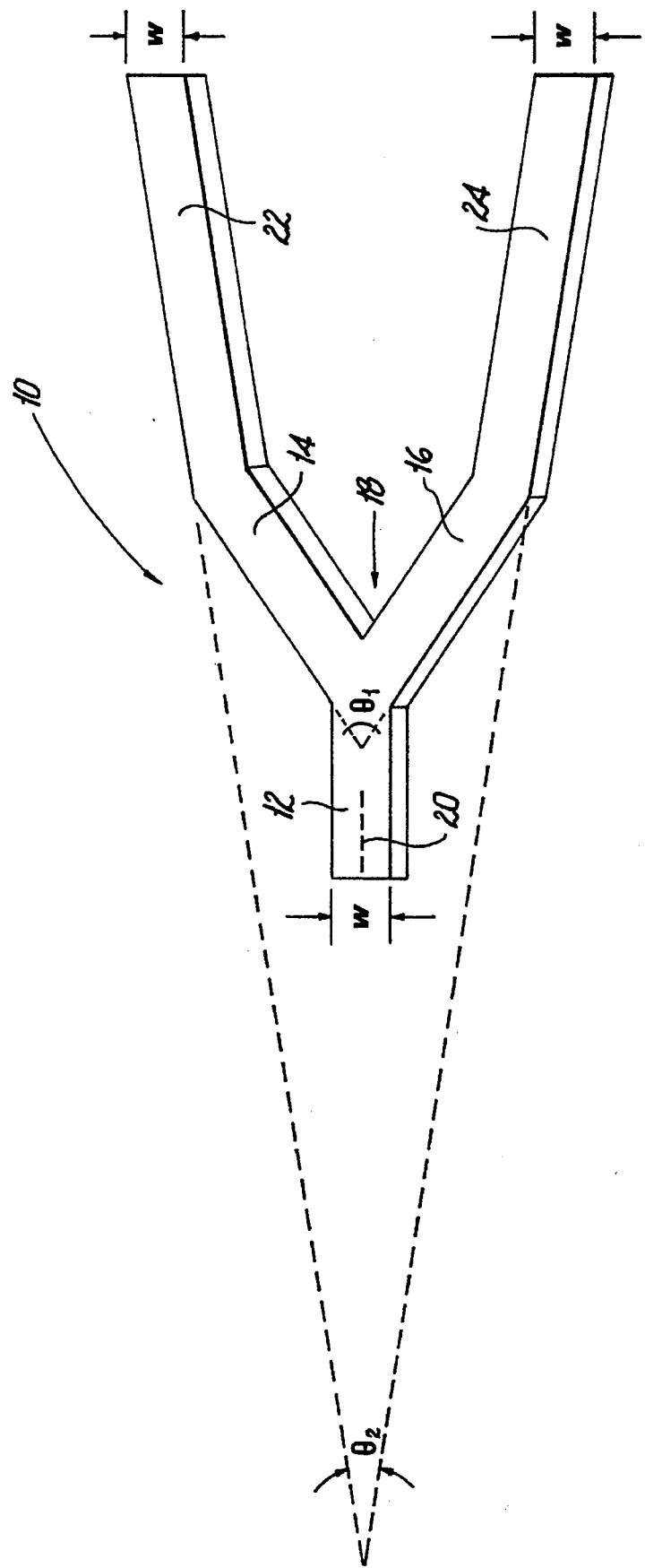
FIG. 1 illustrates a Y-branch switch in the prior art.
Figure 2:
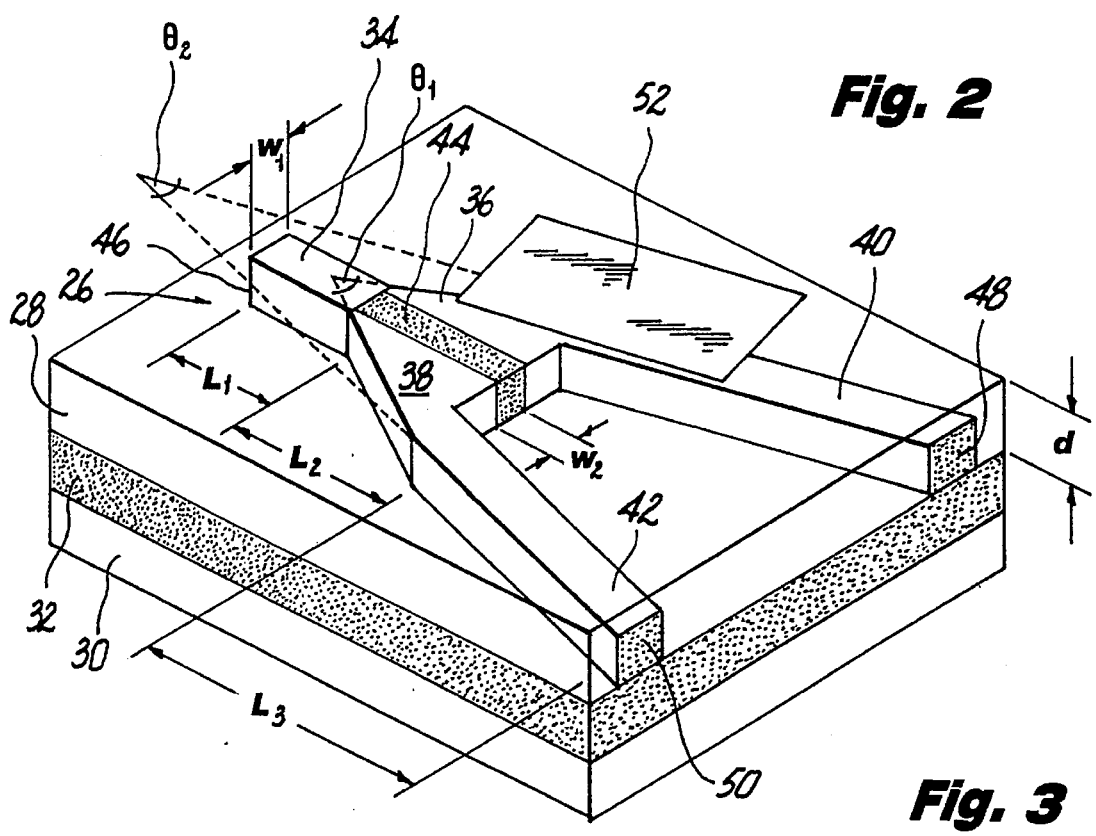
FIG. 2 illustrates an exemplary embodiment of the disclosed Y-branch switch.

Referring now in specific detail to the drawings, with like reference numerals identifying similar or identical elements, as shown in FIG. 2, the present disclosure describes a Y-branch switch 26 which may be grown on n-type InP substrates. Upper cladding 28 and lower cladding 30 may be p-type and n-type InP, respectively, which may have thicknesses on the order of about 1.0 µm. The disclosed switch 26 includes an active core 32 and waveguide portions 36–42 fabricated as a waveguide layer structure grown by a metallorganic chemical vapor deposition (MOCVD) process (known in the art) on the n-type InP substrate 28, with the active core 32 being about 0.55 µm thick and having, for example, about 30 quantum wells, which may be composed of InGaAsP/InP. It is understood that one skilled in the art may fabricate the quantum wells using other materials and growth methods. It is also understood that one skilled in the art may use other materials for the cladding and substrate. Reactive ion etching with $CH_4/H_2$ may be used to etch the waveguide portions 34–42 and an electrical isolation groove or gap 44 in one step.

The disclosed switch 26 includes a first waveguide portion 34, intermediate waveguide portions 36, 38, and branch waveguide portions 40, 42 fabricated in a manner substantially similar to the composition of the active core 32. The first waveguide portion 34 includes an input port region 46, and the branch waveguide portions 40, 42 include a respective output port region 48, 50.

In an exemplary embodiment, the waveguide width $w_1$ of waveguide portions 34–42 may be about 3.0 µm and the etch depth d may be about 1.65 µm. The disclosed switch 26 may be planarized with polyimide, with access vias etched on top of the waveguide portions 34–42, and Cr/Au contact pads such as pad 52 may be evaporated on top of respective waveguide portions 34–42. The disclosed switch 26 may be mounted on Cu posts and terminated with chip resistors of about 47 Ω (not shown in FIG. 2).

As described in M. N. Khan et al., "Design and Demonstration of Weighted-Coupling Digital Y-Branch Optical Switches in InGaAs/InGaAlAs Electron Transfer Waveguides", JOURNAL OF LIGHTWAVE TECHNOLOGY, VOL. 12, NO. 11, November 1994, pp. 2032–2039; and in M. N. Khan et al., "Weighted-Coupling Y-Branch Optical Switch in InGaAs/InGaAlAs Quantum Well Electron Transfer Waveguides", IEEE PHOTONICS TECHNOLOGY LETTERS, VOL. 6, NO. 3, March 1994, pp. 394–397, the taper angles $\theta_1$ and $\theta_2$ and lengths of the waveguide portions 36–42 may be optimized to improve performance of Y-branch switches.

In a preferred embodiment, the first waveguide portion 34 may be substantially straight with a length $L_1$ of about 100 µm, and functions as a passive waveguide section for receiving electromagnetic energy at an input port.

Each intermediate waveguide portion 36, 38 may have a substantially triangular shape with a length $L_2$ of about 180 µm and forming, with an region 44 therebetween, a substantially trapezoidal shape associated with a first taper angle $\theta_1$ of about 1.8°. That is, rays parallel to an associated surface of the trapezoidal shape define the first taper angle $\theta_1$ at their intersection, as shown in FIG. 2.

Each branch waveguide portion 40, 42 may be substantially straight and have a length $L_3$ of about 620 µm and an associated second taper angle $\theta_2$ of about 0.2°; i.e. rays parallel to an associated surface of each branch waveguide portion 40, 42 define the second taper angle $\theta_2$ at their intersection, as shown in FIG. 2.

The trapezoidal section has a first base where the branch waveguide portions 40, 42 merge, and a second base tapers with the first taper angle $\theta_1$. The trapezoidal section, including the intermediate waveguide portions 36, 38, functions as an active common waveguide section for converting the received electromagnetic energy from the first waveguide portion 36 to optical energy at one of a first and second refractive indexes. Each of the branch waveguide portions 40, 42 is operatively connected to a respective intermediate portion 36, 38 and is arranged to receive the optical energy at the respective first and second refractive indexes.

The disclosed switch 26 thus provides a relatively compact Y-shaped adiabatic structure with a total length $L_{TOTAL}$ of about 900 µm. It is understood that one skilled in the art may implement the disclosed switch 26 with waveguide portions 34–42 that are curved, where each of waveguide portions 34–42 is configured and/or having tangential surfaces forming angles substantially near the taper angles $\theta_1$ and $\theta_2$.

The electrical isolation gap 44 is positioned at the vertex of the Y-branch between the intermediate waveguide portions 36, 38, with the width $w_2$ of the gap 44 being about 1.6 µm, which provides for relative ease in fabrication of the disclosed switch 26. Such electrical isolation may be achieved by either ion implantation or etching.

The disclosed switch 26 with the exemplary configuration described above provides for low crosstalk, ease of fabrication, and low propagation loss. The disclosed switch 26 has a reduced voltage-length product while providing fabrication tolerance and a better crosstalk performance at a shorter device length than heretofore attained.

As described in M. N. Khan et al., "Design and Demonstration of Weighted-Coupling Digital Y-Branch Optical Switches in InGaAs/InGaAlAs Electron Transfer Waveguides", supra. at 2035, crosstalk values are plotted as a function of the taper angles $\theta_1$ and $\theta_2$, where the first taper angle $\theta_1$ may be in the range of about 1.5° to about 2.0° to attain improved crosstalk performance. The disclosed switch 26 as described above has a first taper angle $\theta_1$ for a sufficient taper of the branch waveguide portions 40, 42 to be fabrication tolerant for photolithography techniques known in the art. The relatively wide first taper angle $\theta_1$ followed by the relatively narrow second taper angle $\theta_2$ maintains the adiabaticity of the disclosed switch 26.

In an exemplary embodiment, the disclosed switch 26 has a propagation loss of about 1.25 dB/mm and excess losses as low as about 0.10 dB in 900 µm long devices. The disclosed switch 26 also provides for digital switching characteristics with a crosstalk of about –25 dB for an active length of about 800 µm, which may be attained by providing an index change $\Delta n$ of about 0.001 in one of branch waveguide portions 40, 42 with respect to the other, with a radiation loss of about 0.05 dB. Such crosstalk values may be verified using beam propagation methods (BPM) known in the art. Such an index change is also fabrication tolerant since the relatively wide first taper angle $\theta_1$ allows the isolation gap 44 in the Y-branch vertex to be relatively large.

The disclosed switch 26 may also perform high-speed switching operations by using a voltage-controlled refractive index change, allowing for a 3 dB bandwidth of about 10 GHz employing a switching voltage of about –4 V.

Figure 3:
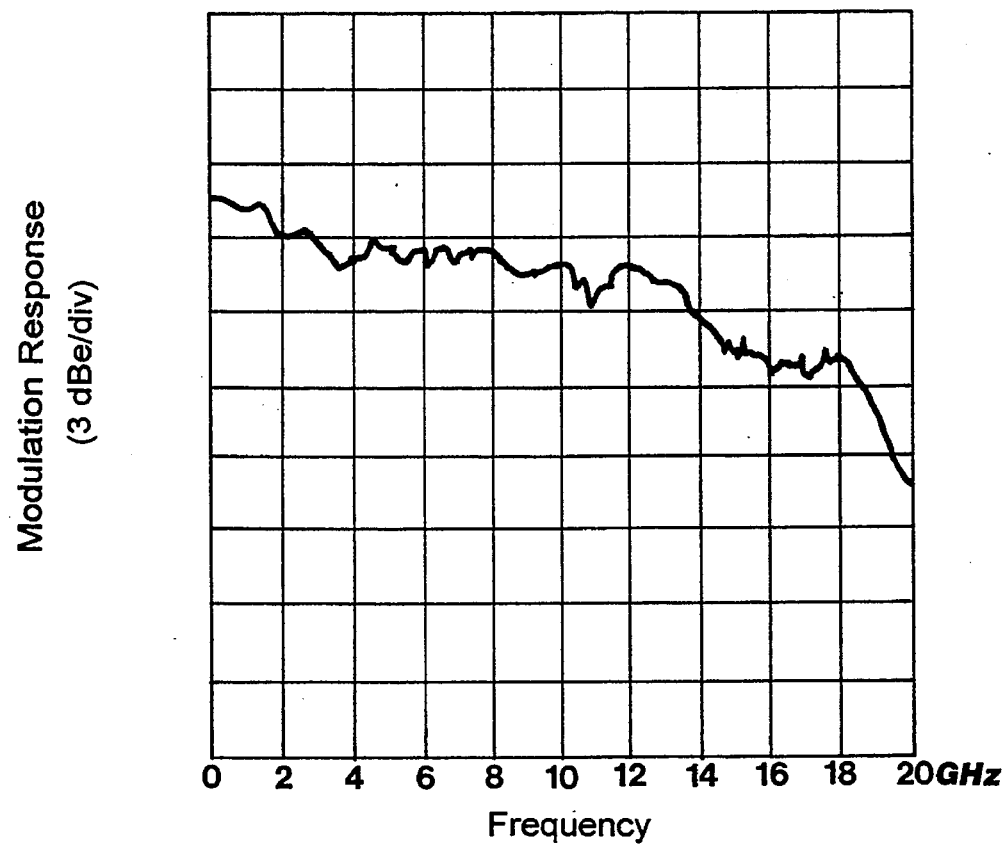
FIG. 3 illustrates a graph of a modulation response of the disclosed Y-branch switch.

The crosstalk performance may be further improved by simultaneously driving both arms with two different negative DC biases to increase the differential index change between the two ports. The signal modulation response of the disclosed switch as a function of drive frequency is shown in FIG. 3, which was measured using an HP 8703 optical network analyzer. A 3 dB electrical bandwidth of 10 GHz may then be attained by the disclosed switch 26 to be the highest speed reported for a digital switch. The measured data yields values of packaged switch inductance L of about 0.6 nH and capacitance C of about 0.32 pF, with contact series resistance R of about 46 Ω. An exemplary voltage used for switching is less than about −4 V with a single branch waveguide portion of the disclosed switch 26 being driven.

While the disclosed tapered Y-branch switch has been particularly shown and described with reference to the preferred embodiments, it is understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. An optical switch comprising:

a first waveguide portion;

a plurality of intermediate waveguide portions connected to the first waveguide portion and associated with a first angle $\theta_1$, wherein the first angle $74_1$ is less than about 2.0°; and a plurality of branch waveguide portions connected to a respective intermediate waveguide portion and associated with a second angle $\theta_2$, wherein the second angle $\theta_2$ is less than $\theta_1$ and is less than about 0.3°;

wherein each of the intermediate waveguide portions and branch waveguide portions has an associated length, wherein the first and second angles and the associated lengths provide about 3 dB electrical bandwidth of about 10 GHz.

2. The optical switch of claim 1 wherein the first angle $\theta_1$ is about 1.8°.

3. The optical switch of claim 1 wherein the second angle $\theta_2$ is about 0.2°.

4. The optical switch of claim 1 wherein each of the intermediate waveguide portions is configured to have a region therebetween providing substantial electrical isolation between the intermediate waveguide portions.

5. The optical switch of claim 1 wherein the region has an associated width of about 1.6 μm.

6. The optical switch of claim 4 wherein the region is formed by an ion implantation process.

7. The optical switch of claim 4 wherein the region is formed by an etching process.

8. The optical switch of claim 1 wherein each of the intermediate waveguide portions and branch waveguide portions has an associated length, wherein the first and second angles and the associated lengths provide for a reduced crosstalk value of the optical switch of about −25 dB.

9. The optical switch of claim 1 wherein each of the intermediate waveguide portions and branch waveguide portions has an associated length, wherein the first and second angles and the associated lengths provide a reduced voltage-length product.

10. The optical switch of claim 1 wherein each of the intermediate waveguide portions and branch waveguide portions has an associated length, wherein the first and second angles and the associated lengths provide a reduced overall length of the optical switch.

11. The optical switch of claim 10 wherein the reduced overall length provides a reduced propagation loss associated with the optical switch.

12. A digital optical switch having a tapered Y-branch configuration comprising:

a first waveguide portion having an input port;

a region connected to the first waveguide portion;

a plurality of intermediate waveguide portions connected to the first waveguide portion and the region, each intermediate waveguide portion and the region being configured in a substantially trapezoidal shape associated with a first angle $\theta_1$, wherein the first angle $\theta_1$ is about 1.8°; and a plurality of branch waveguide portions, each branch waveguide portion connected to a respective intermediate waveguide portion and having a respective output port, with each branch waveguide portion associated with a second angle $\theta_2$, wherein the second angle $\theta_2$ is less than $\theta_1$ and is about 0.2°, and wherein first waveguide portion, the intermediate waveguide portions, the region, and the branch waveguide portions are configured to be in the tapered Y-branch configuration.

13. The digital optical switch of claim 12 wherein each of the intermediate waveguide portions is configured to have the region therebetween having an associated width of about 1.6 μm and providing substantial electrical isolation between the intermediate waveguide portions.

14. The digital optical switch of claim 13 wherein the region is formed by an ion implantation process.

15. The digital optical switch of claim 13 wherein the region is formed by an etching process.

16. The digital optical switch of claim 12 wherein each of the intermediate waveguide portions and branch waveguide portions has an associated length, wherein the first and second angles and the associated lengths provide for a reduced crosstalk value of the digital optical switch of about −25 dB.

17. The optical switch of claim 12 wherein each of the intermediate waveguide portions and branch waveguide portions has an associated length, wherein the first and second angles and the associated lengths provide about 3 dB electrical bandwidth of about 10 GHz.

18. A semiconductor-based digital optical switch comprising:

a first waveguide portion having an input port;

a plurality of intermediate waveguide portions connected to the first waveguide portion, each intermediate waveguide portion forming a substantially trapezoidal shape associated with a first angle $\theta_1$, wherein the first angle $\theta_1$ is about 1.8°;

a plurality of branch waveguide portions, each branch waveguide portion connected to a respective intermediate waveguide portion and having a respective output port, with each branch waveguide portion associated with a second angle $\theta_2$, wherein the second angle $\theta_2$ is less than $\theta_1$ and is about 0.2°; and wherein each of the first waveguide portion, the intermediate waveguide portions, and the branch waveguide portions are disposed on an InP substrate and are operatively connected to an active region including a plurality of InGaAsP/InP quantum wells.

19. The semiconductor-based digital optical switch of claim 18 wherein each of the first waveguide portion, the intermediate waveguide portions, and the branch waveguide portions are disposed on the InP substrate by a metallorganic chemical vapor deposition (MOCVD) process.

20. A digital optical switch comprising:

a Y-shaped adiabatic structure including:

a) first and second waveguide branches separated from each other by a distance of no more than 1.5 μm such that the first and second waveguide branches define an angle of 0.2° at their intersection, the first and second waveguide branches being arranged to receive optical energy at respective first and second refractive indexes; and b) a trapezoidal shaped active common waveguide section, including:

a first base wherein the first and second waveguide branches merge; and a second base that is:

i) tapered to an angle of no more than 2.0°; and ii) is coupled to a substantially straight passive waveguide section;

wherein the trapezoidal shaped active common waveguide section is adapted to convert electromagnetic energy received from the substantially straight passive waveguide section to the optical energy at one of the first and second refractive indexes.

21. The digital optical switch of claim 20 wherein the Y-shaped adiabatic structure is less than about 900 μm long.

22. The digital optical switch of claim 20 wherein each of the first and second waveguide branches is less than about 620 μm long.

23. The digital optical switch of claim 20 wherein the trapezoidal shaped active common waveguide section is less than about 180 μm long.

24. The digital optical switch of claim 20 wherein the substantially straight passive waveguide section is less than about 90 μm long.

25. An optical switch comprising:

a first waveguide portion;

a plurality of intermediate waveguide portions connected to the first waveguide portion and associated with a first angle $\theta_1$, wherein the first angle $\theta_1$ is about 1.8°; and a plurality of branch waveguide portions connected to a respective intermediate waveguide portion and associated with a second angle $\theta_2$, wherein the second angle $\theta_2$ is less than $\theta_1$ and is less than about 0.3°.

26. An optical switch comprising:

a first waveguide portion;

a plurality of intermediate waveguide portions connected to the first waveguide portion and associated with a first angle $\theta_1$, wherein the first angle $\theta_1$ is less than about 2.0°, wherein each of the intermediate waveguide portions is configured to have a region therebetween, the region having an associated width of about 1.6 θm and providing substantial electrical isolation between the intermediate waveguide portions; and a plurality of branch waveguide portions connected to a respective intermediate waveguide portion and associated with a second angle $\theta_2$, wherein the second angle $\theta_2$ is less than $\theta_1$ and is less than about 0.3°.

27. An optical switch comprising:

a first waveguide portion;

a plurality of intermediate waveguide portions connected to the first waveguide portion and associated with a first angle $\theta_1$, wherein the first angle $\theta_1$ is less than about 2.0°; and a plurality of branch waveguide portions connected to a respective intermediate waveguide portion and associated with a second angle $\theta_2$, wherein the second angle $\theta_2$ is less than $\theta_1$ and is less than about 0.3°;

wherein each of the intermediate waveguide portions and branch waveguide portions has an associated length, wherein the first and second angles and the associated lengths provide for a reduced crosstalk value of the optical switch of about −25 dB.

* * * * *